United States Patent [19]

Hayashi et al.

[11] Patent Number: 5,676,355
[45] Date of Patent: Oct. 14, 1997

[54] SUSPENSION SYSTEM

[75] Inventors: Naoki Hayashi, Kasugai; Yoshikazu Tsukamoto, Komaki; Hiroyuki Koba, Toyota, all of Japan

[73] Assignees: Tokai Rubber Industries, Ltd., Komaki; Toyota Jidosha Kabushiki Kaisha, Toyota, both of Japan

[21] Appl. No.: 622,518

[22] Filed: Mar. 25, 1996

[30] Foreign Application Priority Data

Mar. 23, 1995 [JP] Japan .................. 7-064484

[51] Int. Cl.⁶ .................. B60G 15/02; F16F 3/10; F16F 9/54
[52] U.S. Cl. .................. 267/221; 188/322.12; 267/219; 267/220; 267/33; 267/286; 267/170; 267/179; 267/153
[58] Field of Search .................. 267/286, 291, 267/33, 34, 166, 170, 179, 221, 220, 219, 128, 292, 153; 188/322.12; 280/668

[56] References Cited

U.S. PATENT DOCUMENTS

| | | | |
|---|---|---|---|
| 3,051,469 | 8/1962 | Boschi | 267/33 |
| 4,148,469 | 4/1979 | Geyer | 267/179 |
| 4,319,768 | 3/1982 | Youngdale | 280/668 |
| 4,462,608 | 7/1984 | Lederman | 280/668 |
| 4,477,061 | 10/1984 | Kawaura et al. | 267/8 |
| 4,568,067 | 2/1986 | Iwata | 267/33 |
| 4,771,996 | 9/1988 | Martinez, Jr. | 267/220 |
| 4,969,542 | 11/1990 | Athmer et al. | 188/322.12 |
| 5,249,781 | 10/1993 | Wöhler | 267/33 |
| 5,421,565 | 6/1995 | Harkrader et al. | 280/668 |

FOREIGN PATENT DOCUMENTS

| | | |
|---|---|---|
| 0407360 | 1/1991 | European Pat. Off. . |
| 0480443A2 | 4/1992 | European Pat. Off. . |
| 1402926 | 11/1967 | France . |
| 1492826 | 11/1967 | France . |
| 2578611 | 9/1986 | France . |
| 9004089 | 6/1990 | Germany . |
| 60-173406 | 11/1985 | Japan . |

OTHER PUBLICATIONS

Japanese Unexamined Utility Model Publication (JIKKAI) No. 61-139804, Publication date, Aug. 29, 1986.

*Primary Examiner*—Douglas C. Butler
*Attorney, Agent, or Firm*—Jacobson, Price, Holman & Stern, PLLC

[57] ABSTRACT

A suspension system includes a shock absorber, a coil spring, a tubular dust cover, and an insulator. The shock absorber is provided with a first seat and a second seat at the opposite ends. The insulator is disposed between the first seat and the coil spring, and includes a body for holding the coil spring, and a contact projecting from the body in a centripetal direction and having a portion being brought into contact with one of the opposite ends of the dust cover. The insulator forms a space between the first seat and an outer portion with respect to the portion of the contact. Thus, the insulator reduces the wear of the first seat resulting from the contact with the dust cover, inhibits the first seat from corroding, and keeps the strength of the first seat from decreasing.

6 Claims, 4 Drawing Sheets

SUSPENSION SYSTEM

BACKGROUND OF THE INVENTION

1. Field of the Invention

The present invention relates to a suspension system which is applicable to automobiles.

2. Description of Related Art

A suspension system has been interposed between a wheel and an automobile body in order to damp vibrations which are transmitted from the wheel to the automobile body. As illustrated in FIG. 4, such a suspension has been known to comprise a shock absorber 11, a coil spring 18, and a tubular dust cover 13. The shock absorber 11 includes a tubular member 11a, and a piston rod 11b. The tubular member 11a is connected to a wheel. The piston rod 11b is disposed so as to advance and retract with respect to the tubular member 11a, and is connected to an automobile body. The coil spring 18 is disposed outside the shock absorber 11 by a predetermined space, and has opposite ends. One of the opposite ends of the coil spring 18 is held on a first seat 16, which is installed to the tubular member 11a, by way of an insulator 17. Another one of the opposite ends of the coil spring 18 is held on a second seat 15, which is installed to the piston rod 11b. The dust cover 13 is disposed between the shock absorber 11 and the coil spring 18, and has opposite ends. One of the opposite ends of the dust cover 13 is held by the piston rod 11b.

The piston rod 11b is held sildably on the tubular member 11a. In order to reliably protect the upper-end sealing portion of the tubular member 11a, the dust cover 13 accordingly tends to be longer in the downward direction. As a result, the lower end of the dust cover 13 is placed in proximity with the first seat 16, and consequently contacts with the first seat 16 with an increasing frequency when bounding occurs.

The first seat 16 is usually made from metal, and is subjected to a cationic painting, etc., for ensuring an adequate rust-proof on the surface. However, the cationic paint film is worn out by being repeatedly brought into contact with the dust cover 13. As a result, the first seat 16 is corroded, or its metallic substrate is come off to decrease the strength.

Japanese Unexamined Utility Model Publication (KOKAI) No. 60-173,406 discloses a technique for coping with the problem. According to the publication, the dust cover 13 is provided with a projection at the lower end, thereby decreasing the contacting area between the dust cover 13 and the first seat 16.

However, if a projection is formed at the lower end of the dust cover 13 as disclosed in the publication, the entire load of the dust cover 13 is transmitted as a whole to the first seat 16 by way of the projection when the dust cover 13 contacts with the first seat 16. As a result, the first seat 16 is subjected to a concentrated load at the contact with the projection, and may possibly be worn out quickly.

SUMMARY OF THE INVENTION

The present invention has been developed in view of the aforementioned problems. It is therefore an object of the present invention to provide a suspension system which enables to reduce the wear of a first seat resulting from the contact with a dust cover, to inhibit it from corroding, and to keep its strength from decreasing.

A suspension system according to the present invention carries out the object, and comprises:

a shock absorber including a tubular member, a piston rod disposed so as to advance and retract with respect to the tubular member, a first seat installed to the tubular member, and a second seat installed to the piston rod;

a coil spring disposed outside the shock absorber by a predetermined space, and having opposite ends, one of the opposite ends held on the first seat by way of an insulator, another one of the opposite ends held on the second seat; and a tubular dust cover having opposite ends, and disposed between the shock absorber and the coil spring, one of the opposite ends held by the piston rod;

the insulator including a body for holding the coil spring, and a contact projecting from the body in a centripetal direction and having a portion being brought into contact with another one of the opposite ends of the dust cover, the insulator forming a space between the first seat and an outer portion with respect to the portion of the contact, the portion being brought into contact with another one of the opposite ends of the dust cover, when the contact and another one of the opposite ends of the dust cover are brought into contact with each other.

In a modified version of the present suspension system, the contact is free from contacting with the first seat when it is kept from contacting with another one of the opposite ends of the dust cover.

In the present suspension system, the shock absorber contracts against the urging force of the coil spring when bounding occurs. The dust cover descends together with the piston rod, and contacts with the contact of the insulator at the lower end. At this moment, when the contact itself is rigid, the contact receives the load of the dust cover. Thus, the load is little transmitted to the first seat. Moreover, when the contact is somewhat rigid, the contact flexes. Accordingly, the load is relieved, and the relieved load is transmitted to the first seat. As a result, the load of the dust cover is hardly transmitted to the first seat as it is. Therefore, it is possible to reduce the wear of the first seat, to inhibit the first seat from corroding, and to keep the strength of the first seat from decreasing.

Further, when the contact and another one of the opposite ends of the dust cover are brought into contact with each other, the insulator forms a space between the first seat and an outer portion with respect to the portion of the contact, portion which is brought into contact with another one of the opposite ends of the dust cover. As a result, the contact contacts with the surface of the first seat over a reduced area, and foreign materials, such as water, etc., are less likely to reside between the contact and the first seat. Hence, it is possible to securely inhibit the first seat from corroding.

Furthermore, in the modified version of the present suspension system, when the contact is free from contacting with another one of the opposite ends of the dust cover, the contact is kept from contacting with the first seat. Therefore, in the modified version, it is possible to further relieve the load being transmitted from the dust cover to the first seat by way of the contact, and to further securely inhibit the first seat from corroding.

In accordance with the present suspension system, the insulator includes the body for holding the coil spring, and the contact. The contact projects from the body in a centripetal direction, and has the portion being brought into contact with another one of the opposite ends of the dust cover. When the contact and another one of the opposite ends of the dust cover are brought into contact with each other, the insulator forms the space between the first seat and an outer portion with respect to the portion of the contact, portion which is brought into contact with another one of the opposite ends of the dust cover. The thus constructed insulator enables to reduce the wear of the first seat resulting from the contact with the dust cover, to inhibit the first seat from corroding, and to keep the strength of the first seat from decreasing.

Moreover, in the modified version of the present suspension system, when the contact is kept from contacting with another one of the opposite ends of the dust cover, the contact is free from contacting with the first seat. The thus constructed contact enables to further relieve the load being transmitted from the dust cover to the first seat by way of the contact, and to further securely inhibit the first seat from corroding.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Figure 1:
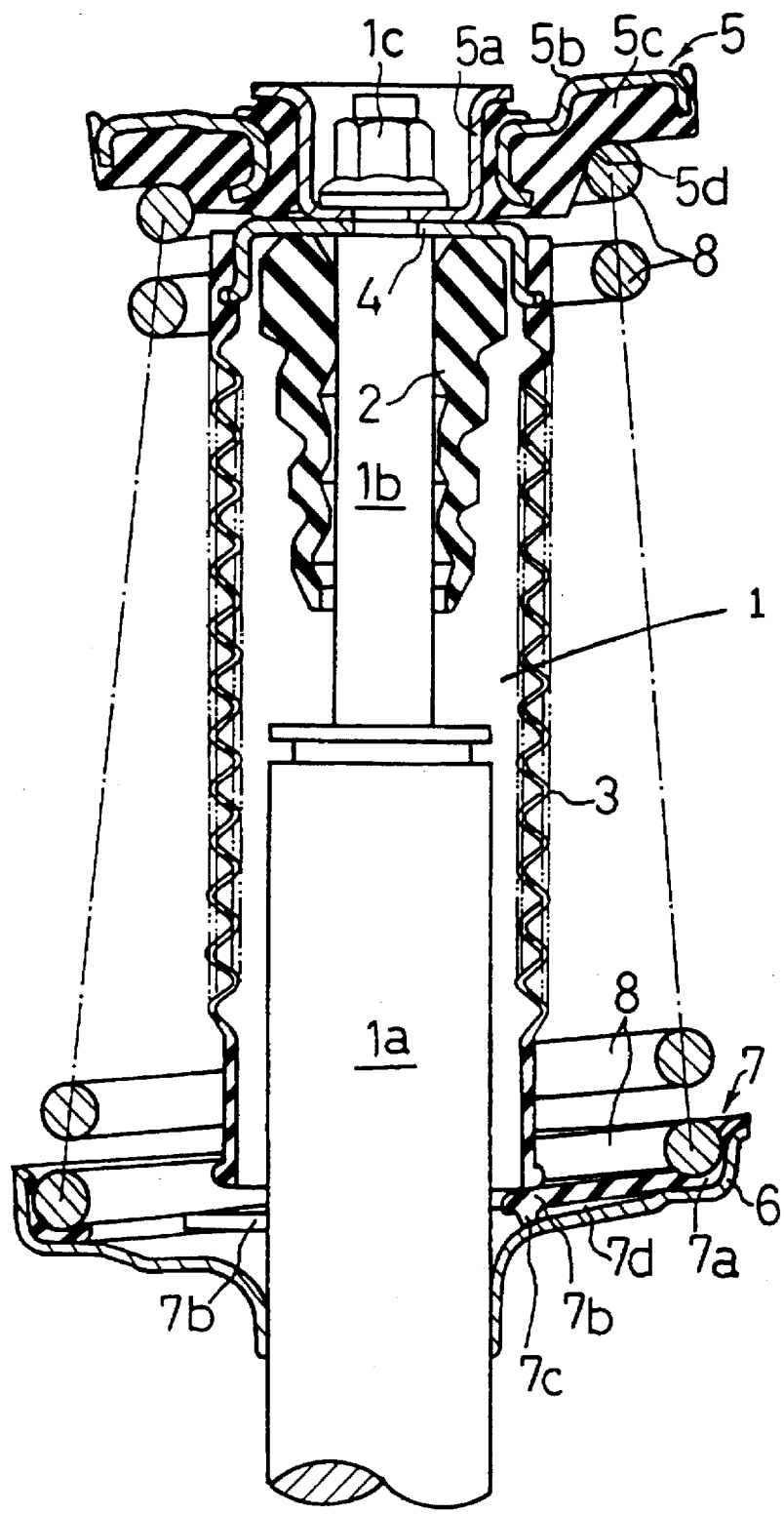
FIG. 1 is a cross-sectional view of a Preferred Embodiment of a suspension system according to the present invention.
Figure 2:
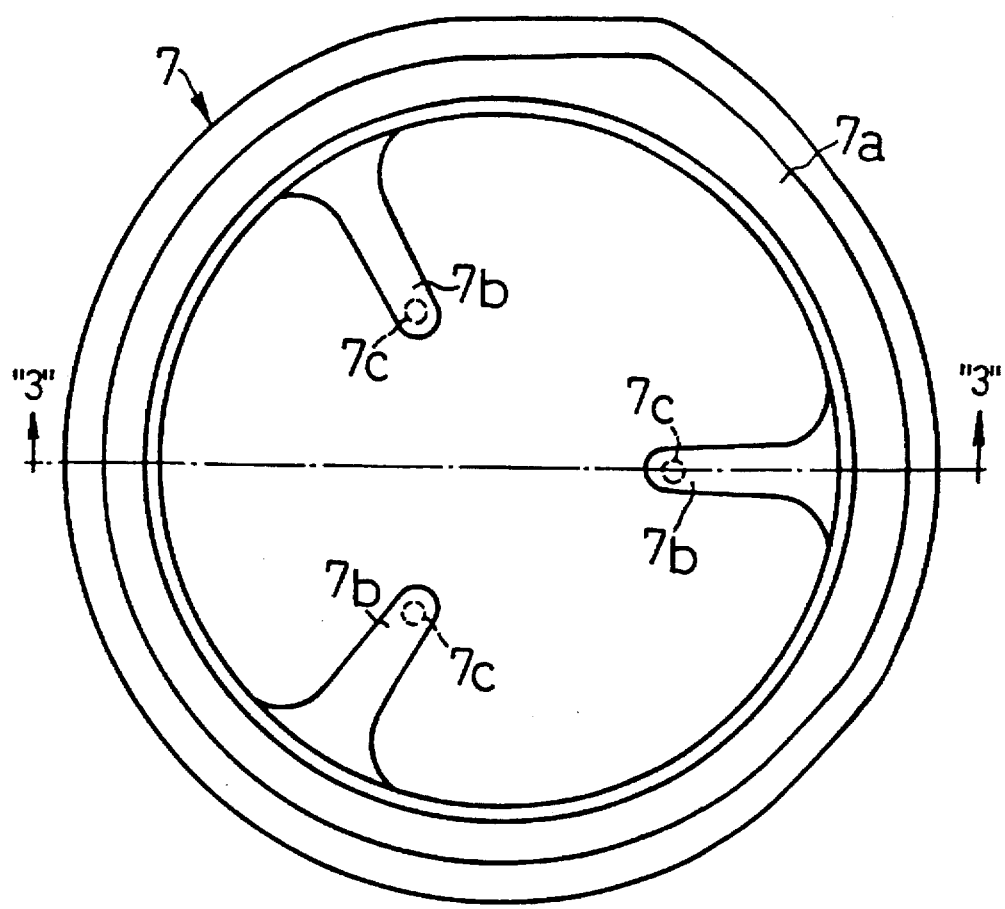
FIG. 2 is a plan view of an insulator in the Preferred Embodiment of the present suspension system.
Figure 3:
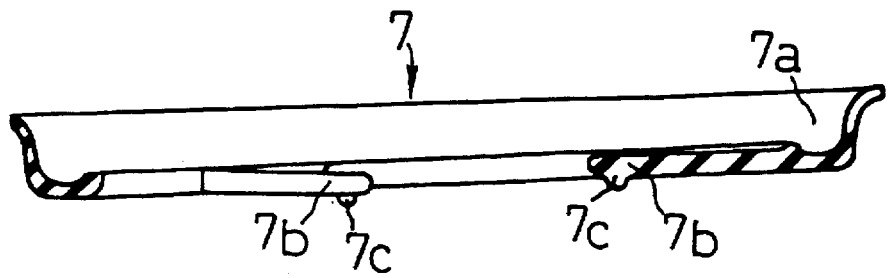
FIG. 3 is a cross-sectional view taken along line "3"—"3" of FIG. 2.
Figure 4:
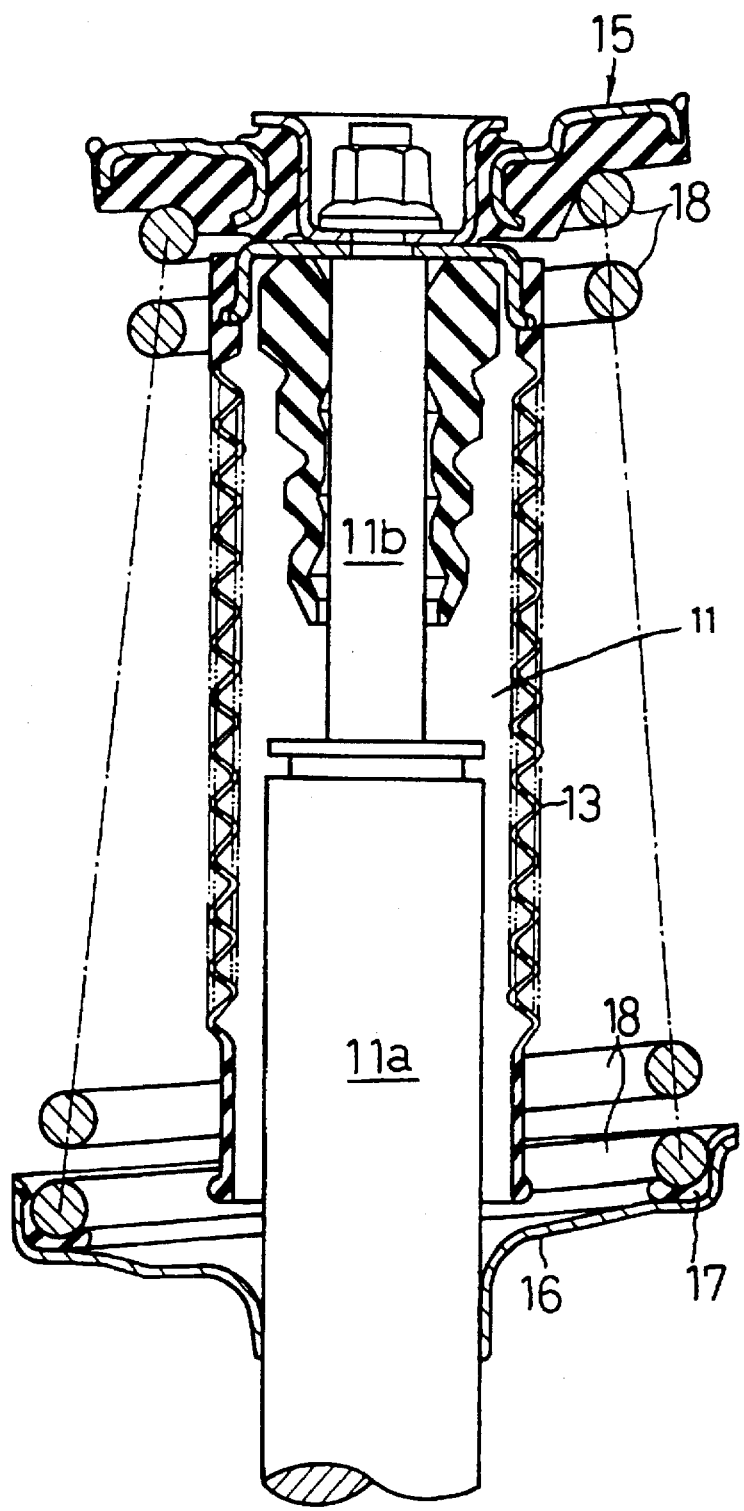
FIG. 4 is a cross-sectional view of the conventional suspension system.

FIG. 1 illustrates a cross-sectional view of a Preferred Embodiment of the present suspension system. FIG. 2 illustrates a plan view of an insulator in the Preferred Embodiment. FIG. 3 illustrates a cross-sectional view taken along line "3"—"3" of FIG. 2.

As illustrated in FIG. 1, the Preferred Embodiment of the present suspension system is provided with a shock absorber 1. The shock absorber 1 includes a tubular member $1a$, and a piston rod $1b$. The tubular member $1a$ is connected with a wheel. The piston rod $1b$ is connected with a vehicle body operably so as to advance and retract with respect to the tubular member $1a$. The piston rod $1b$ has opposite ends, and is provided with a rubber stopper 2 and a holder firing 4 at the leading end. The rubber stopper 2 inhibits the piston rod $1b$ from excessively displacing downward. The holder firing 4 holds a dust cover 3 which covers around the piston rod $1b$.

The holder fitting 4 is formed as a cylindrical shape having opposite ends. The lower end of the holder fitting 4 is opened, and the upper end thereof is opened so as to form an installation hole by its inner peripheral surface. Into the installation hole, the piston rod $1b$ is fitted at the upper leading end which is provided with a male-threaded portion, and which is fastened to the holder fitting 4 by a nut $1c$.

The rubber stopper 2 is formed virtually as a cylindrical shape having bellows. When the rubber stopper 2 is disposed on the outer periphery of the piston rod $1b$, it is fastened to the upper-end inner peripheral surface of the holder fitting 4 at the upper end.

The dust cover 3 is formed substantially as a cylindrical shape having bellows, and has a diameter slightly larger than that of the tubular member $1a$ of the shock absorber 1. The dust cover 3 is fastened to an outer periphery of the holder fitting 4 at the upper end.

The male-threaded upper end of the piston rod $1b$ is provided with an upper seat 5 (i.e., the second seat) which is disposed so as to superimpose on the upper end of the holder fitting 4. The upper seat 5 includes a cylinder-shaped installation fitting $5a$, a ring-shaped reinforcement fitting $5b$, and a ring-shaped rubber block $5c$. The reinforcement fitting $5b$ is disposed outside the installation fitting $5a$ coaxially therewith. The rubber block $5c$ is bonded integrally with the installation fitting $5a$ and the reinforcement fitting $5b$ by vulcanization, and is formed virtually as a disk. In addition, the rubber block $5c$ is provided with a ring-shaped seat surface $5d$ on the lower surface.

A lower seat 6 (i.e., the first seat) is fastened by welding to a lower outer peripheral surface of the tubular member $1a$ of the shock absorber 1. The lower seat 6 is made from metal, and is formed substantially as a dish shape having a central hole. The shock absorber 1 is fitted into the central hole of the lower seat 6, and fastened thereto by welding.

A coil spring 8 having upper and lower ends is interposed between the lower seat 6 and upper seat 5. The coil spring 8 is held by the lower seat 6 at the lower end by way of an insulator 7, and is held by the seat surface $5d$ of the upper seat 5.

As illustrated in FIG. 2, the insulator 7 includes a ring-shaped body $7a$, and three contacts $7b$. The body $7a$ holds the coil spring 8. As shown in FIG. 2, the contacts $7b$ project from an inner peripheral surface of the body $7a$ in a centripetal direction, and are spaced equally by a predetermined angle in a circumferential direction. As can be appreciated from FIG. 1, the contacts $7b$ project up to a position where their leading end goes slightly beyond the lower-end inner peripheral surface of the dust cover 3. Accordingly, the leading end of the contacts $7b$ can contact with the lower end of the descending dust cover 3.

Moreover, as illustrated in FIGS. 1 and 3, the contacts $7b$ are provided with a projection $7c$ on their lower surface of their leading end. The projection $7c$ forms a space $7d$ between the lower surface of the contacts $7b$ and the upper surface of the lower seat 6 when the lower end of the dust cover 3 contacts with the contacts $7b$. For instance, FIG. 1 illustrates a situation, in which the piston rod $1b$ moves downward, and thereby the dust cover 3 descends to contact with the contacts $7b$.

Note that, when the lower end of the dust cover 3 can contact with the contacts $7b$ so as to produce a space between the lower surface of the contacts $7b$ and the upper surface of the lower seat 6, it is unnecessary to provide the projections $7c$ for the insulator 7.

The thus constructed Preferred Embodiment of the present suspension system is connected to a wheel at the tubular member $1a$ of the shock absorber 1, and is connected to a vehicle body at the leading end of the piston rod $1b$ by way of the holder fitting 4 and the upper seat 5. When bounding occurs, the piston rod $1b$ contracts downward against the urging force of the coil spring 8. The dust cover $3b$ descends together with the piston rod $1b$, and contacts with the contacts $7b$ of the insulator 7 at the lower end. Accordingly, the load of the dust cover 3 is transmitted to the lower seat 6 by way of the contacts 7b which are flexed by elastic deformation. As a result, the load of the dust cover 3 is hardly transmitted to the lower seat 6 as it is. Hence, the lower seat 6 is worn less, is inhibited from corroding, and its strength is kept from decreasing.

There is formed the space 7d between the lower surface of the contacts 7b and the upper surface of the lower seat 6 by the projections 7b which are provided on the lower surface of the contacts 7b. Thus, the contacts 7b and the lower seat 6 contact with each other with a reduced contact area. Therefore, the foreign materials, such as water, are less likely to reside at the contact.

As having been described so far, the Preferred Embodiment of the present suspension system includes the insulator 7 which is provided with the contacts 7b. The contacts 7b project from the body 7a of the insulator 7 in a centripetal direction, and are disposed so as to be present at positions where they contact with the lower end of the descending dust cover 3. Thus, the insulator 7 enables to reduce the wear of the lower seat 6 resulting from the contact with the dust cover 3, to inhibit the lower seat 6 from corroding, and to keep the strength of the lower seat 6 from decreasing.

In addition, the contacts 7b of the insulator 7 are provided with the projection 7c on their lower surface. The projections 7c form the space 7d between the lower surface of the contacts 7b and the upper surface of the lower seat 6. Thus, the contacts 7b contact with the upper surface of the lower seat 6 with a reduced area, and accordingly the foreign materials, such as water, are less likely to reside therebetween. As a result, the insulator 7 can inhibit the lower seat 6 from corroding further reliably.

Instead of providing the projection 7c on the lower surface of the contacts 7b, or in addition to the provision, the contacts 7b can be made from materials which have such rigidity that flees the contacts 7b from contacting with the lower seat 6 when the contacts 7b are kept from contacting with the lower end of the dust cover 3. With this arrangement, the insulator 7 can effect the advantages similarly to the provision of the projections 7c, or can produce a further shock-relieving effect.

Figure 5:
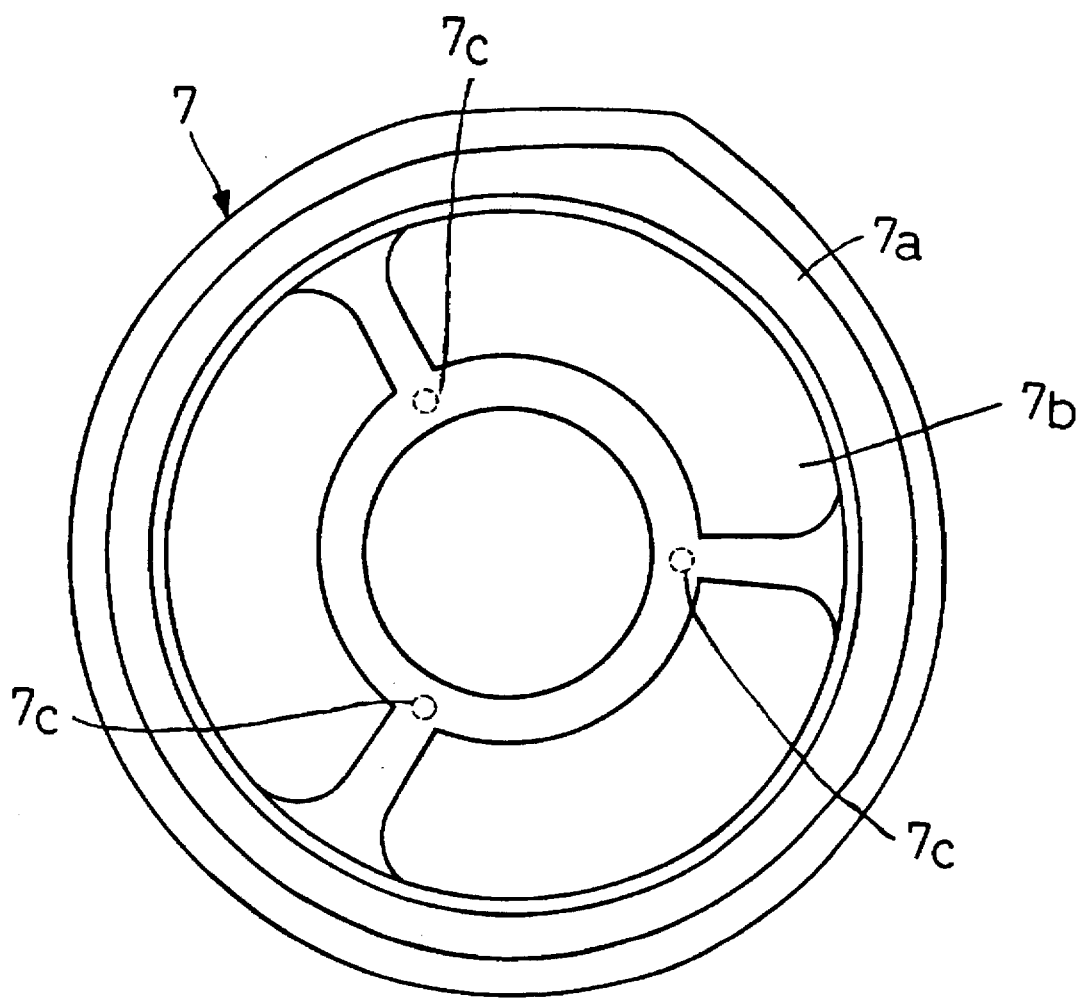
FIG. 5 is a modified version of the insulator in the Preferred Embodiment of the present suspension system.

In the present suspension system, the insulator 7 can be provided with the contacts 7b in a quantity of three at least when the contacts 7b are spaced equally by a predetermined angle in a circumferential direction. Note that the insulator 7 can be provided with three or more of the contacts 7b. Moreover, a single ring-shaped portion of a contact can substitute for the portion of the contacts 7b. For instance, the single ring-shaped portion of the contact covers all the area, with which the lower end of the descending dust cover 3 contacts, in a circumferential direction as illustrated in FIG. 5.

Having now fully described the present invention, it will be apparent to one of ordinary skill in the art that many changes and modifications can be made thereto without departing from the spirit or scope of the present invention as set forth herein including the appended claims.

What is claimed is:

1. A suspension system, comprising:

a shock absorber including a tubular member, a piston rod disposed so as to advance and retract with respect to the tubular member, a first seat installed to the tubular member, and a second seat installed to the piston rod;

a coil spring disposed outside said shock absorber by a predetermined space, and having opposite ends, one of the opposite ends held on the first seat by way of an insulator, another one of the opposite ends held on the second seat; and a tubular dust cover having opposite ends, and disposed between said shock absorber and said coil spring, one of the opposite ends held by the piston rod;

said insulator including a body for holding said coil spring, and a contact projecting from the body in a centripetal direction and having a portion being brought into contact with another one of the opposite ends of said dust cover, the insulator forming a space between the first seat and an outer portion with respect to the portion of the contact, the portion being brought into contact with another one of the opposite ends of said dust cover, when the contact and another one of the opposite ends of said dust cover are brought into contact with each other.

2. The suspension system according to claim 1, wherein said contact is free from contacting with said first seat when it is kept from contacting with another one of the opposite ends of said dust cover.

3. The suspension system according to claim 1, wherein said contact is provided with a projection on its lower surface, projection which is brought into contact with an upper surface of said first seat.

4. The suspension system according to claim 1, wherein said contact is such firm that it is free from contacting with said first seat when it is kept from contacting with another one of the opposite ends of said dust cover.

5. The suspension system according to claim 1, wherein said insulator is provided with said contacts, which are spaced equally by a predetermined angle in a circumferential direction, in a quantity of three at least.

6. The suspension system according to claim 1, wherein said portion of said contact is formed as a single ring-shaped portion.

* * * * *